(12) United States Patent
Liu

(10) Patent No.: US 11,945,416 B1
(45) Date of Patent: Apr. 2, 2024

(54) AIRSTREAM IMPROVER FOR VEHICLES

(71) Applicant: Wei Liu, Arlington, TN (US)

(72) Inventor: Wei Liu, Arlington, TN (US)

( * ) Notice: Subject to any disclaimer, the term of this patent is extended or adjusted under 35 U.S.C. 154(b) by 261 days.

(21) Appl. No.: 17/476,274

(22) Filed: Sep. 15, 2021

(51) Int. Cl.
*B60S 1/66* (2006.01)
*B62D 35/00* (2006.01)

(52) U.S. Cl.
CPC .............. *B60S 1/66* (2013.01); *B62D 35/00* (2013.01)

(58) Field of Classification Search
CPC .... B60S 1/66; B60S 1/02; B62D 35/00; B60J 1/2002; B60J 1/2008
See application file for complete search history.

(56) References Cited

U.S. PATENT DOCUMENTS

| | | |
|---|---|---|
| 3,529,862 A | 9/1970 | Jousserandot |
| 4,810,022 A | 3/1989 | Takagi et al. |
| 4,867,397 A | 9/1989 | Pamadi et al. |
| 2005/0115943 A1* | 6/2005 | Winter ................ B60S 1/0848 219/202 |
| 2008/0303310 A1 | 12/2008 | Breidenbach |
| 2009/0307861 A1 | 12/2009 | Lin |
| 2014/0104426 A1* | 4/2014 | Boegel ................ B60R 1/10 348/148 |
| 2017/0259788 A1* | 9/2017 | Villa-Real ........... B60R 1/0602 |
| 2018/0170456 A1* | 6/2018 | Schroeck ........... B62D 35/008 |
| 2019/0383204 A1* | 12/2019 | Wolf ................... F01P 11/10 |

FOREIGN PATENT DOCUMENTS

| | | | | |
|---|---|---|---|---|
| DE | 10105695 A1 * | 9/2002 | ......... | B60J 1/2002 |
| DE | 10231693 A1 * | 1/2004 | ......... | B60R 1/0602 |
| DE | 102017006135 A1 * | 1/2019 | | |

* cited by examiner

*Primary Examiner* — Lori Lyjak

(57) ABSTRACT

This invention is an air intake device that is to create at least one airstream and to eject the airstream to improve a vehicle's safety functionality and performance, such as clearing raindrops off certain surfaces, e.g., side rearview mirrors, front window, rear window, and headlights of the vehicle for better driver's visibility and/or for improving the aerodynamics of the vehicle.

23 Claims, 5 Drawing Sheets

AIRSTREAM IMPROVER FOR VEHICLES

CROSS-REFERENCE TO RELATED APPLICATIONS

None

STATEMENT REGARDING FEDERALLY SPONSORED RESEARCH OR DEVELOPMENT

This is solely my personal invention and is not made with or related to any federal funding.

REFERENCE TO A "SEQUENCE LISTING"

None

BACKGROUND OF THE INVENTION

In pursuit of the best possible functionality and performance, vehicles have become more and more complicated. As described below, many inventions have been made for the purpose of clearing off raindrops on rearview mirrors as well as for the purpose of improving vehicle aerodynamics.

Patent Application (US20090307861A1. Application U.S. Ser. No. 12/139,518) proposes a mechanical design that involves a rearview mirror, a motorized wiper, a driving gear, two supporting shafts, and a motor. Said mechanical assembly allows said wiper to move laterally and to sweep over the surface of said rearview mirror, and in doing so said wiper wipes raindrops off. Said design can offer proactive wiping action whenever necessary. However, it certainly suffers several disadvantages, including: (1) add a certain degree of complexity to rearview mirror assembly, (2) would be prone to mechanical and electrical failures, (3) would require electric power supply for the functioning of said motorized wiper, and (4) would also require maintenance of said wiper due to wear and tear over time and regular maintenance of said driving gear, such as lubrication. More severely, the driver would have his or her rearview vision interrupted by said wiper, a dangerous driving situation, when said wiper moves back and forth across the surface of said rearview mirror.

Patent (CN206812892U. Application CN201720690494) proposes a rainproof set to employ rain shield over rearview mirrors. Said rainproof set includes 2 fixation strips, rain shield, a base that has an upper part and a lower part. Said upper part and said lower part of said base form a clamping jaw. Raindrops on rearview mirror are avoided by said rainproof shield. Such a design is simple in nature. Nevertheless, it is not able to clean any raindrops that are attached to said rearview mirrors, as raindrops can be blown around by wind and land on said rearview mirrors.

Patent (WO2012022258A1. Application PCT/CN2011/078502) proposes a rain cap for motor vehicle rearview mirrors, which comprises a rain a brim and a back wing connected to said brim. This is a simple non-moveable design that shields the rearview mirrors from raindrops. However, as raindrops can be blown around by wind and fall on said rearview mirrors, such a design is incapable of dispelling any raindrops on said rearview mirrors, as is the case with the above-mentioned patent.

Patent (CN204956298U. Application CN201520729177.5U) proposes a double-sided mirror with a turning mechanism and a wiping mechanism. The side of said rearview mirror with raindrops is turned inside and raindrops attached to it are sucked and wiped away, while the other "clean" side is turned out to serve as the functional rearview mirror. Said design demonstrates a tremendous degree of ingenuity. However, said design would definitely suffer many drawbacks, including: (1) add a high degree of mechanical complexity to said rearview mirrors, (2) would be prone to mechanical and electric failures, (3) would require electric power supply for said design to function as described, (4) would require maintenance of said wiping mechanism due to wear and tear over time and regular maintenance of said turning mechanism and said wiping mechanism, and (5) increase associated production cost as well. At the same time, the durability of said design could be called into question. More serious is the issue of interrupted rearview vision that the driver has to endure whenever said double-side mirror flips over, which creates a dangerous driving situation.

It is widely known that mechanically-driven wipers have been used to clear off raindrops on the headlights of Mercedes-Benz cars and Volvo cars. Theses mechanical wipers employ a rubber blade to scrape raindrops off the surface of headlights and function well when they are properly maintained. However, over time they suffer from the usual wear-and-tear problem and are also prone to mechanical breakdowns.

At the same time, there has been an ongoing trend to improve vehicle aerodynamics to enhance vehicle performance and increase fuel economy or range for electric vehicles. Various types of inventions have been patented and put to use, such as spoilers and air vents. For that purpose, vehicle aerodynamics has benefitted tremendously as a result.

Patent (U.S. Pat. No. 3,529,862A. Application: US688224A) proposes the use of spoiler and air nozzle to improve the aerodynamics of a vehicle. This invention is embodied in two forms. The first form is "rigid strip extending substantially at right angles to the outer surface of the vehicle along the width thereof, in the vicinity of the vehicle portion having the maximum curvature and connecting the roof to the rear portion of the vehicle body." Such a spoiler concept has been widely used in many vehicles, ranging from F-1 racing cars to ordinary passenger vehicles. The second form is "nozzle means adapted to cause a primary air stream to be ejected through a transverse slot located as in the preceding case at or in close vicinity to the curved joint between the roof and the rear wall of the vehicle body." Said primary air stream carries a certain quantity of secondary aft taken from inner or passenger space. What is important about this invention is the fact that the second form of embodiment, i.e., said nozzle means, is functionally dependent upon the first embodiment, i.e., said rigid strip. In simple words, the second form of embodiment will not function without the first form of embodiment.

Patent Application (WO2016020418A1. Application PCT/EP2015/068025) proposes the use of one or more guide vanes, each of which is disposed at each of a respective front and/or rear quarter of the vehicle for guiding the airflow in the vicinity of an adjacent wheel of the vehicle wherein each guide vane k movable from a retracted position to a deployed position.

Patent (U.S. Pat. No. 4,810,022A. Application U.S. Ser. No. 06/719,076) proposes the use of aerodynamic accessory, such as front spoiler and/or rear spoiler, whose position is automatically adjusted according to the driving condition, e.g., vehicle speed, crosswinds, and road condition, etc. Such active spoilers have become commonplace in supercars nowadays. Actuates place said spoiler in either the fully retracted position or the fully extended position. There is no doubt that such a spoiler serves its purpose well. More recent designs employ active spoilers that are positioned in any of many positions, making the spoiler more attuned to the driving condition.

Patent (U.S. Pat. No. 4,857,397A, Application U.S. Ser. No. 07/120,487) proposes a land-based vehicle drag reduction system, which comprises vertical panels attached perpendicularly on the surface of said vehicle, facing into the incoming airstream. While such a design may indeed improve the overall aerodynamics of said vehicle, it may affect the vision of the driver of said vehicle, as could be clearly seen in patent's drawings.

Patent (US20080303310A1. Application U.S. Ser. No. 12/134,348) proposes the use of an "apparatus including an exterior cover supported by moveable frames which in turn are supported by sets of supporting linkages. The moveable frames extend rearward and together with the exterior cover form a drag reducing shape for use in a drag reducing configuration and collapse for use in a space saving configuration." This is especially beneficial for vehicle without streamlined surfaces, However, it is not highly practical for passenger vehicles.

Patent Application (EP0290614A1. Application EP87906942A) proposes the use of an air dam skirt that has smaller air resistance than ordinary air dams, offer more downward force, and is more resistant to impacts. Said air dam is suspended from the vehicle body, is moveable on some guiding members., according to predetermined settings. Such a design may offer reduced aerodynamics. But it may suffer increased weight and complexity, which may offset the potential benefits.

In the real world of automobiles, air curtains and air vents have been used on some modern vehicles, such as Ferrari F12 and Toyota bZ 4X. In the case of Ferrari F12, two long non-enclosed air channels are employed on the hood to funnel incoming air into two air vents. Said incoming air then comes out said air vents to provide a boundary layer of smooth air down the flanks of said Ferrari F12. In the case of Toyota bZ 4X, said air curtains are used to let in incoming air, thus reducing "effective frontal area" for lower aerodynamic drag.

All of said patents, said patent applications, and said designs mentioned heretofore offer special utilities in their respective applications, and may function well as intended. However, they have limitations or shortcomings as discussed above.

BRIEF SUMMARY OF THE INVENTION

This invention is to create an airstream and to eject said airstream to improve a vehicle's functionality and performance, such as clearing raindrops off certain surface of said vehicle and/or improving the aerodynamics of said vehicle.

DETAILED DESCRIPTION OF THE INVENTION

This invention could be applied to different types of applications. Described below are two of the feasible application types, in which this invention is used to improve a vehicle's functionality and performance. The first type of application is an airstream raindrop wiper that clears raindrops off certain arears of a vehicle, such as rearview mirrors and headlights, to improve vehicle safety. For instance, the exterior rearview mirrors of a vehicle would not be able to provide a clear rearview vision if they are covered in raindrops. Similarly, vehicle headlights would not be able to provide the best possible illumination ahead if they are covered in raindrops. The second type of application is an airstream aerodynamic improver of vehicles for better fuel economy and/or longer range in case of electric vehicles. It is important to note (1) that said two types of applications can be fundamentally related in certain situations, and (2) that the various features of said airstream raindrop wipers described below can be combined in a design to achieve a better performance for a specific application. Likewise, the features of said airstream aerodynamic improver described below can be combined for better results asl well. Furthermore, the features of said airstream raindrop wipers and the features of said airstream aerodynamic improver can be combined in a design as needed. The term of "vehicle" as used in this invention encompasses all mobile vehicles and devices of any kind, be it land-based, airborne, or otherwise.

Airstream Raindrop Wiper

Figure 1:
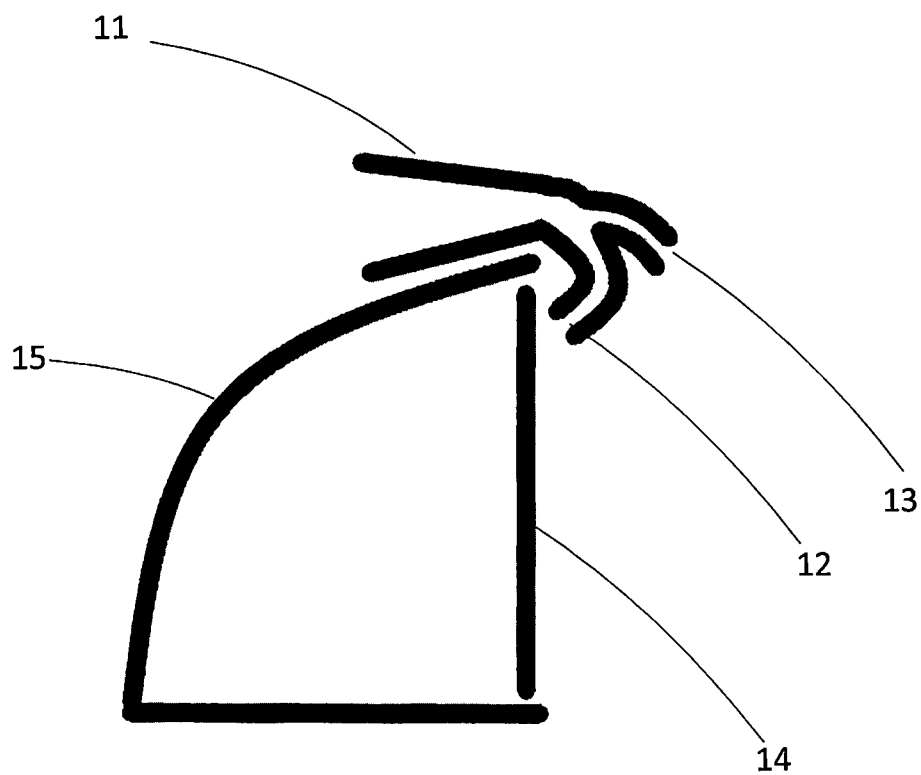
FIG. 1 shows a scheme of non-motorized airstream raindrop wiper on a rearview mirror assembly.
Figure 2:
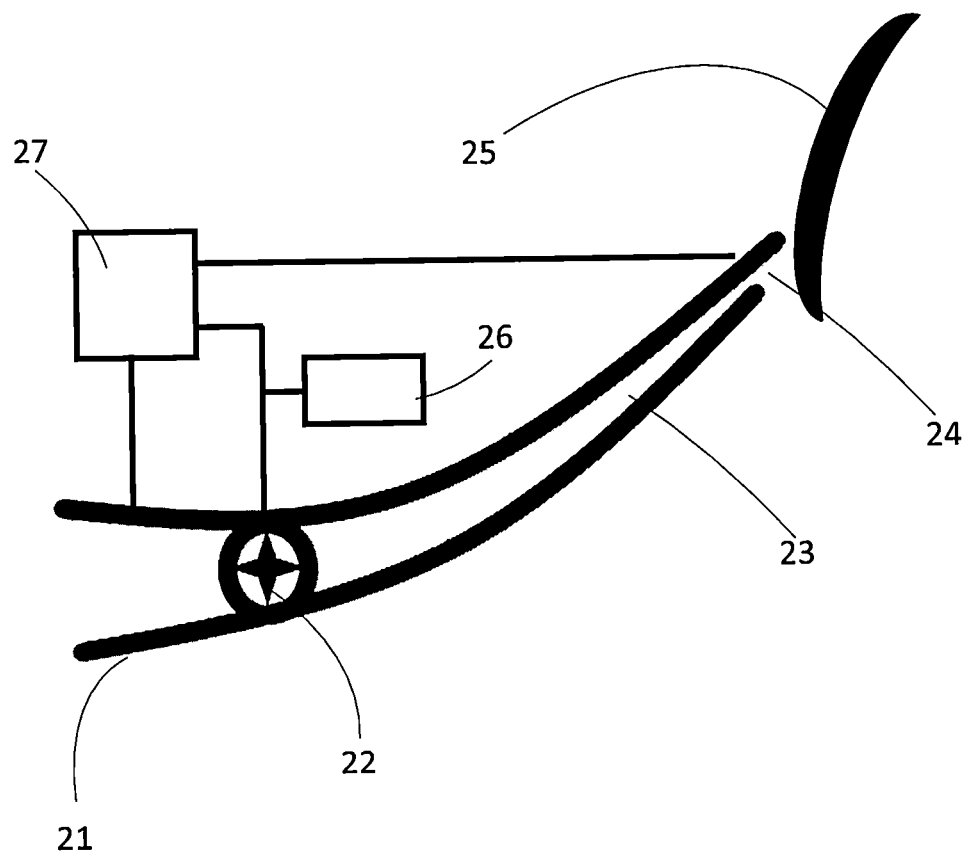
FIG. 2 illustrates a scheme of motorized airstream raindrop wiper for a headlight.

There are at least two designs to said airstream raindrop wiper: one non-motorized design and one motorized design. Illustrated in FIG. 1 is a non-motorized airstream raindrop wiper design for an exterior rearview mirror of a vehicle, having air intake device with a predetermined interior shape 11 (FIG. 1), air nozzle-like means for directing air outflow 12 (FIG. 1), raindrop-bypass means 13 (FIG. 3) for channeling raindrops out of said air intake device, rearview mirror 14 (FIG. 1), and rearview mirror assembly 15 (FIG. 1). Depicted in FIG. 2 is a motorized airstream raindrop wiper design for a vehicle headlight, having air intake device with a predetermined interior shape 21 (FIG. 2), motorized impeller-like means 22 (FIG. 2) for causing or assisting outside air to enter said air intake device 21 (FIG. 2) to form an airstream, air duct means 23 (FIG. 2) for channeling said airstream, air nozzle-like means for directing air outflow 24 (FIG. 2), headlight lens 25 (FIG. 2), a rain-sensing means 26 (FIG. 2) for measuring the intensity of rainfall and controlling said motorized impeller-like means 22 (FIG. 2) accordingly, and a control unit 27 (FIG .2).

Said air nozzle-like means 12 (FIGS. 1 & 24 FIG. 2) comprises at least one outlet with a predetermined cross-sectional shape. Said raindrop-bypass means 13 (FIG. 1) comprises (1) a predetermined physical shape that helps separate raindrops that are collected along with said airstream from said airstream, and (2) at least one tube that is positioned and arranged in a predetermined way to facilitate the outflow of said raindrops for discharge out of said air intake device 11 (FIG. 1). Said motorized impeller-like means 22 (FIG. 2) may assume the design of a ducted fan or a centrifugal air blower, among other feasible configurations. Both said ducted fan and said centrifugal blower may be powered by an electric motor connected to an electric power supply on said vehicle. Needless to say, a viable alternative is that said ducted fan and said centrifugal air blower may be mechanically driven by a power source on said vehicle to serve the same intended purpose. It is important to note that other types of designs, such as positive displacement, helical screw, regenerative, and diaphragm chamber, can also be viable options. Said air-duct means 23 (FIG. 2) comprises at least one air duct that allows said airstream to efficiently reach said air nozzle-like means 24 (FIG. 2). Said rain-sensing means 26 (FIG. 2) may comprise at least one raindrop sensor that detects any rainfall and a control mechanism that adjusts the performance, e.g., rotational speed, of said motorized impeller-like means 22 (FIG. 2) accordingly. Alternatively, said rain-sensing means 26 (FIG. 2) may send its signals to said control unit 27 (FIG. 2) for control of said motorized impeller-like means 22 (FIG. 2). Said control unit 27 (FIG. 2) may also control the operations of said motorized impeller-like means 22 (FIG. 2) as well as said air intake device 21 (FIG. 2) and said air nozzle-like means 24 (FIG. 2) when variable geometry structures are employed.

Ram air effect or air pressure differential between different parts of said vehicle is utilized in said non-motorized airstream raindrop wiper shown in FIG. 1. For instance, said air intake device 11 (FIG. 1) may be installed to approximately face the same direction of said vehicle's movement, causing outside air to enter said air intake device 11 (FIG. 1) when said vehicle is in motion. Another option is to place said air intake device behind the cooling fan of an internal combustion engine, air conditioner radiator, or batteries (in case of electric vehicles) on said vehicle. Said air intake device 11 (FIG. 1) may assume various interior shapes, such as an interior shape that narrows down as said outside air moves along the inside of said air intake device 11 (FIG. 1), thus creating an airstream. Alternatively, an air pressure differential, instead of said ram air effect, may be harvested to serve the same purpose. When said vehicle is in motion, air pressure around one part of said vehicle, such as an air scoop in the front of said vehicle, can be higher than the air pressure around another part of said vehicle, such as the rear window of said vehicle. Therefore, said air pressure differential can be exploited to create an airstream from said part with the high air pressure to said part with the low air pressure. Said airstream can then be channeled to eject out of said air nozzle-like means 12 (FIG. 1).

In a non-motorized airstream raindrop wiper shown in FIG. 1, said ram air effect is employed to create said airstream. Then said airstream is directed to eject out of said air nozzle-like means 12 (FIG. 1), at a predetermined angle, over the surface of said rearview mirror 14 (FIG. 1), thus clearing raindrops off the surface of said rearview mirror 14 (FIG. 1). Raindrops that are collected along with said airstream in said air intake device 11 (FIG. 1) are discharged via raindrop-bypass means 13 (FIG. 1), because, as illustrated in FIG. 1, raindrops are heavier than said outside air and are less capable of moving along a tight curve, thus flowing out via said raindrop-bypass means 13 (FIG. 1).

Figure 3:
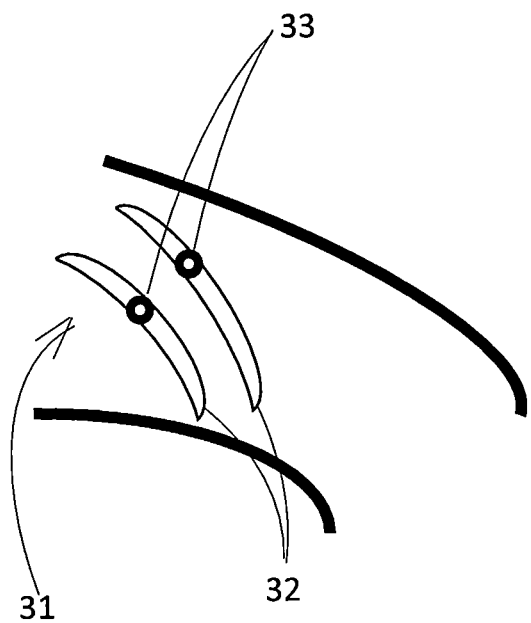
FIG. 3 demonstrates a scheme of air intake device with a variable-geometry structure of moveable vanes.
Figure 4:
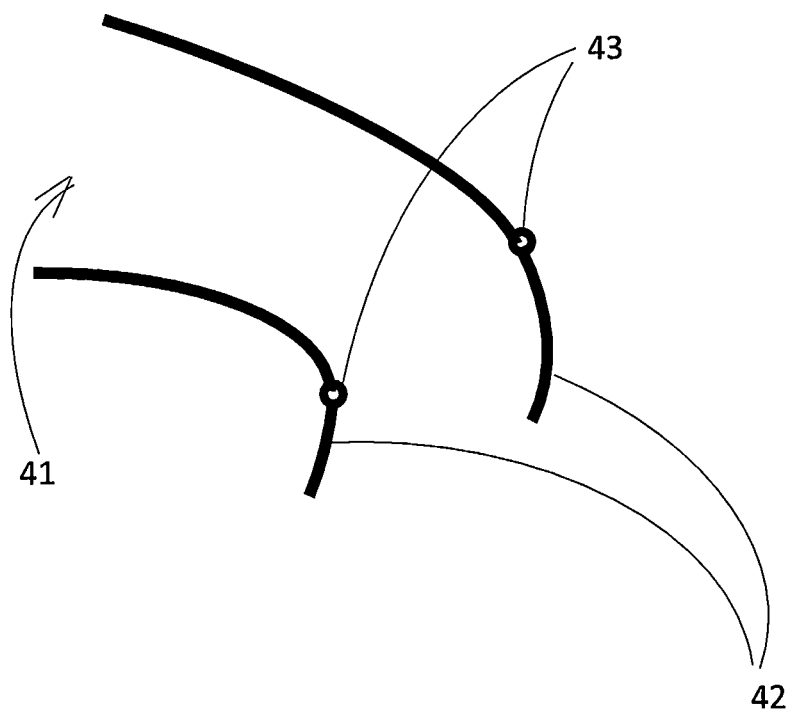
FIG. 4 shows a scheme of air nozzle-like means with a variable-geometry structure of outlet.

Said non-motorized airstream wiper may comprise variable-geometry structures, as illustrated in FIGS. 3 and 4. In FIG. 3, said air intake device 31 (FIG. 3) comprises moveable vanes 32 (FIG. 3) that rotate around their pivotal joints 33 (FIG. 3) to adjust said airstream, while FIG. 4 shows said air nozzle-like means 41 (FIG. 4) with a variable outlet 42 (FIG. 4) that can contract or expand around its pivotal joint 43 (FIG. 4) to adjust air outflow, as in the jet engine of a fighter aircraft.

In a motorized airstream raindrop wiper shown in FIG. 2, said air intake device 21 (FIG. 2) comprises motorized impeller-like means 22 (FIG. 2) that causes or assisting said outside air to enter said air intake device 21 (FIG. 2) to create said airstream and ejects said airstream through said air-duct means 23 (FIG. 2) out of said air nozzle-like means 24 (FIG. 2), at a predetermined angle, over the surface of said headlight lens 25 (FIG. 2). In doing so, said airstream clears said raindrops off said headlight lens 25 (FIG. 2). Said motorized impeller-like means 22 (FIG. 2) can be controlled by said rain-sensing means 26 (FIG. 2) that monitors any rainfall and controls said motorized impeller-like means 22 (FIG. 2) according to the intensity of said rainfall. Alternatively said motorized impeller-like means 22 (FIG. 2) can be controlled by said control unit 27 (FIG. 2) or by both said control unit 27 (FIG. 2) and said rain-sensing means 26 (FIG. 2) in unison. As a result, said air intake device 21 (FIG. 2) can remain substantially effective when said vehicle is not in motion or is moving at a low speed. Said air-duct means 23 (FIG. 2) can allow said air intake device 21 (FIG. 2) to be mounted away from said headlight lens 25 (FIG. 2), thus offering more flexibility in structural design and component arrangements while ensuring smooth flow of said airstream to function efficiently. For instance, said air intake device 21 (FIG. 2) can be mounted under the front bumper of said vehicle. And consequently, said air intake device 21 (FIG. 2) may be largely shielded from said raindrops, possibly eliminating the need for said raindrop-bypass means 13 (FIG. 1). Most importantly, said motorized impeller-like means 22 (FIG. 2) can be used to supplement or substitute said ram air effect or said air pressure differential. With said motorized impeller-like means 22 (FIG. 2), said air intake device 21 (FIG. 2) can also be placed approximately at where said outside air becomes turbulent so that said motorized impeller-like means 22 (FIG. 2) "sucks in" air turbulence and improves the aerodynamics of said vehicle as well.

Figure 5:
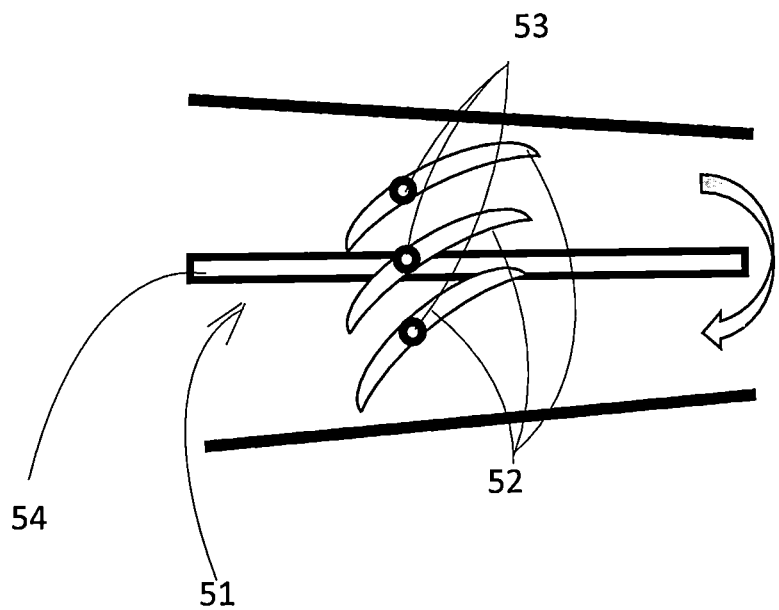
FIG. 5 is a scheme of motorized impeller-like means with a variable-geometry structure of variable-pitch blades.

Said motorized impeller-like means 51 (FIG. 5) may comprise a variable-geometry structure. As shown in FIG. 5, variable-pitch blades 52 (FIG. 5) are employed, and said variable-pitch blades 52 (FIG. 5) rotate around their pivotal joints 53 (FIG. 5) as they spin on their shaft 54 (FIG. 5) in a ducted fan configuration for better performance. It is important to note that other than said motorized impeller-like means 22 (FIG. 2) discussed herein, said airstream can be supplied from other types of impeller-like devices, such as supercharger or turbocharger of an internal combustion engine, the cooling fan of an air conditioner radiator, or the cooling fan of batteries in electric vehicles, which may result in a simpler or more efficient design.

Airstream Aerodynamics Improver

Another type of application of this invention is that it can also be employed to improve the aerodynamics of said vehicle, when said airstream is ejected, at a predetermined angle, over at least one predetermined part of said vehicle. Said at least one predetermined part of said vehicle may be the same as or different from said at least one predetermined area designated for clearing off said raindrops. It is worth noting that said airstream can be used simultaneously for the purpose of improving vehicle aerodynamics and for the purpose of clearing off said raindrops, or solely for achieving one of two said purposes. For instance, when said airstream is ejected out of the top edge of the rear window on said vehicle, it can clear said raindrops off said rear window as well as can assist in improving the aerodynamics of said vehicle. Optionally said airstream can be ejected out around the front window and simultaneously can be ejected out around the rear window, more substantially improving the aerodynamics of said vehicle.

Alternatively, the operation of said airstream can be made to adapt to the real-time driving conditions. One possible scenario is that when a rainfall is detected by said rain-sensing means 26 (FIG. 2), said airstream primarily functions to clear off said raindrops, while during non-rainy times said airstream focuses on improving the aerodynamics of said vehicle.

As with said airstream raindrop wipers, variable-geometry structures can be employed in said air intake device, said air nozzle-like means and said motorized impeller-like means (as illustrated in FIGS. 3, 4, and 5), with said variable-geometry structures being controlled according to at least one predetermined factor. With said motorized impeller-like means, said air intake device can also be placed approximately at where said outside air becomes turbulent so that said motorized impeller-like means "sucks in" air turbulence and improves the aerodynamics of said vehicle. Once again, it is important to note that said airstream can be supplied from other impeller-like devices, such as the supercharger or turbocharger of an internal combustion engine, the coiling fan of an air conditioner radiator, or the cooling fan of batteries in electric vehicles, which may lead to a simpler or efficient design.

It is important to highlight and emphasize that there are certain critical differences between said air intake device discussed herein and said air curtains and said air vents used on some modern vehicles, e.g., such as Ferrari F12 and Toyota bZ 4X. In the case of Ferrari F12, two long non-enclosed air channels on the hood are used to funnel incoming into two air vents, out which said incoming air comes to provide a boundary layer of smooth air down the flanks of said Ferrari F12, with no specific air nozzles of any kind being employed. In the case of Toyota bZ 4X, said air curtains are used to direct incoming air into themselves, thus reducing "effective frontal area" for lower aerodynamic drag. In contrast, said air intake device in my invention does not rely on any open-air channels, and instead uses said ram air effect or said air pressure differential and its predetermined interior shape to create said airstream and to use said air nozzle-like means to eject said airstream.

Another critical difference is that said air intake device in my invention can be placed approximately at where the airflow over the surface of said vehicle becomes turbulent to "suck in"turbulent air, and uses said motorized impeller-like means to eject said airstream in order to energize downstream surface airflow and to delay or avoid the occurrence of turbulent airflow. Last but not the least, said variable-geometry structures can be employed, which can be adjusted according to at least one predetermined factor.

The foregoing description of my invention, including the accompanying drawings, is related only to some of the exemplary or preferred embodiments and applications of this invention, while its true scope, as set forth in the claims listed below, is intended to include all possible and plausible applications, modifications and embodiments, and is not limited to those of the examples, applications, embodiments, and functions described above. Similarly, said drawings shall be regarded as illustrative in nature and not as restrictive as graphically depicted, and the features shown in said drawings and the functionalities described above can be combined in a design, application, or embodiment.

I claim:

1. A method implemented for clearing raindrops off at least one predetermined area of a vehicle, comprising:
   a. using air intake device,
   b. said air intake device including a predetermine interior shape and air nozzle-like means for directing air outflow,
   c. said air intake device substantially using, or making use of, ram air effect or air pressure differential between different areas of said vehicle when said vehicle is in motion to cause or assist outside air to enter said air intake device to create at least one airstream, and
   d. said air intake device ejecting said at least one airstream out of said air nozzle-like means, at a predetermined angle, at said at least one predetermined area of said vehicle.

2. The method of claim 1 wherein said air intake device comprises at least one variable-geometry structure.

3. The method of claim 1 wherein said air nozzle-like means comprises at least one variable-geometry structure.

4. The method of claim 1 further comprising using, or making use of, motorized impeller-like means for causing or assisting said outside air to enter said air intake device.

5. The method of claim 1 further comprising using, or making use of, motorized impeller-like means for causing or assisting said outside air to enter said air intake device, and wherein said impeller-like means comprises at least one variable-geometry structure.

6. The method of claim 1 further comprising using, or making use of, motorized impeller-like means for causing or assisting said outside air to enter said air intake device with said at least one airstream being ejected out of said air nozzle-like means to improve the aerodynamics of said vehicle as well as to clear off said raindrops.

7. The method of claim 1 further comprising ejecting said at least one airstream out of said air nozzle-like means to improve the aerodynamics of said vehicle as well as to clear off said raindrops.

8. The method of claim 1 further comprising using, or making use of, motorized impeller-like means for causing or assisting said outside air to enter said air intake device, and wherein said air intake device is located approximately at where said outside air becomes or is about to become turbulent to improve the aerodynamics of said vehicle.

9. An apparatus for clearing raindrops off at least one predetermined area of a vehicle, comprising:
   a. air intake device,
   b. said air intake device including a predetermined interior shape and air nozzle-like means, and
   c. said air intake device substantially using, or making use of, ram air effect or air pressure differential between different areas of said vehicle when said vehicle is in motion to cause or assist outside air to enter said air intake device to create at least one airstream, and
   d. said air intake device ejecting said at least one airstream out of said air nozzle-like means, at a predetermined angle, at said at least one predetermined area of said vehicle.

10. The apparatus of claim 9 wherein said air intake device comprises at least one variable-geometry structure.

11. The apparatus of claim 9 wherein said air nozzle-like means comprises at least one variable-geometry structure.

12. The apparatus of claim 9 wherein said air intake device comprises motorized impeller-like means for causing or assisting said outside air to enter said air intake device and said air intake device uses, or makes use of, said motorized impeller-like means.

13. The apparatus of claim 9 wherein said air intake device comprises motorized impeller-like means for causing or assisting said outside air to enter said air intake device and said air intake device uses, or makes use of, said motorized impeller-like means, and furthermore motorized impeller-like means comprises at least one variable-geometry structure.

14. The apparatus of claim 9 wherein said air intake device comprises motorized impeller-like means for causing or assisting said outside air to enter said air intake device, and said air intake device uses, or makes use of, said motorized impeller-like means and ejects said at least one airstream out of said air nozzle-like means to improve the aerodynamics of said vehicle as well as to clear off said raindrops.

15. The apparatus of claim 9 wherein said air intake device ejects said at least one airstream out of said air nozzle-like means to improve the aerodynamics of said vehicle as well as to clear off said raindrops.

16. The apparatus of claim 9 wherein said air intake device comprises motorized impeller-like means for causing or assisting said outside air to enter said air intake device, and said air intake device is located approximately at where said outside air becomes or is about to become turbulent to improve the aerodynamics of said vehicle.

17. A method implemented for improving the aerodynamics of a vehicle, comprising
   a. using air intake device,
   b. said air intake device including a predetermined interior shape, and air nozzle-like means for directing air outflow,
   c. said air intake device comprising at least one variable-geometry structure,
   d. said air intake device substantially using, or making use of, ram air effect or air pressure differential between different areas of said vehicle when said vehicle is in motion to cause or assist outside air to enter said air intake device to create at least one airstream, and
   e. said air intake device ejecting said at least one airstream out of said air nozzle-like means, at a predetermined angle, over at least one predetermined part of said vehicle.

18. The method of claim 17 wherein said air intake device is located approximately at where said outside air becomes or is about to become turbulent.

19. The method of claim 17 wherein said air nozzle-like means comprises at least one variable-geometry structure.

20. The method of claim 17 further comprising using, or making use of, motorized impeller-like means for causing or assisting said outside air to enter said air intake device.

21. The method of claim 17 further comprising using, or making use of, motorized impeller-like means for causing or assisting said outside air to enter said air intake device, and wherein said motorized impeller-like means comprises at least one variable-geometry structure.

22. The method of claim 17 further comprising using, or making use of, motorized impeller-like means for causing or assisting said outside air to enter said air intake device, and wherein said air intake device is located approximately at where said outside air becomes or is about to become turbulent.

23. The method of claim 17 further comprising placing said air nozzle-like means approximately at where airflow around said at least one predetermined part of said vehicle becomes or is about to become turbulent.

\* \* \* \* \*